US010212468B1

(12) United States Patent
Sahyoun et al.

(10) Patent No.: US 10,212,468 B1
(45) Date of Patent: Feb. 19, 2019

(54) OBTAINING RATINGS FOR CONTENT ITEMS FROM A GROUP OF USERS WHILE LIMITING A NUMBER OF TIMES THE CONTENT ITEMS ARE PRESENTED TO THE GROUP OF USERS WITHIN A TIME INTERVAL

(71) Applicant: Facebook, Inc., Menlo Park, CA (US)

(72) Inventors: Alexandre Paul Sahyoun, San Francisco, CA (US); Lei Wang, Santa Clara, CA (US); Praveen Alevoor, Mountain View, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 15/908,975

(22) Filed: Mar. 1, 2018

(51) Int. Cl.
*G06F 3/00* (2006.01)
*G06F 13/00* (2006.01)
*H04N 5/445* (2011.01)
*H04N 21/262* (2011.01)
*H04N 21/234* (2011.01)
*H04N 21/45* (2011.01)
*H04N 21/475* (2011.01)

(52) U.S. Cl.
CPC . *H04N 21/26266* (2013.01); *H04N 21/23424* (2013.01); *H04N 21/26258* (2013.01); *H04N 21/4532* (2013.01); *H04N 21/4756* (2013.01)

(58) Field of Classification Search
CPC ......... H04N 21/25891; H04N 21/2407; H04N 21/2668; H04N 21/252; H04N 21/25866; H04N 21/25883; H04N 21/44204; H04N 21/44213; H04N 21/44222; H04N 21/4532; H04N 21/458; H04N 21/4667
See application file for complete search history.

(56) References Cited

U.S. PATENT DOCUMENTS

| 8,108,895 | B2 * | 1/2012 | Anderson | G06Q 30/02 705/14.4 |
| 8,701,145 | B1 * | 4/2014 | Berger | H04N 21/4147 725/32 |
| 2008/0307454 | A1 * | 12/2008 | Ahanger | G06Q 30/02 725/36 |
| 2013/0024901 | A1 * | 1/2013 | Sharif-Ahmadi | G06F 17/30017 725/114 |
| 2015/0256869 | A1 * | 9/2015 | Rai | H04N 21/26283 725/35 |
| 2015/0325268 | A1 * | 11/2015 | Berger | H04N 21/26258 386/248 |

* cited by examiner

*Primary Examiner* — Jason P Salce
(74) *Attorney, Agent, or Firm* — Fenwick & West LLP

(57) ABSTRACT

An online system presents content items to a group of users who provide ratings for the content items. Based on ratings received from various users of the group, the online system generates data describing presentation of the content items to users of the group. Because of a limited number of users in the group, the online system enforces rules that limit the ability to show content items to users of the group within a time interval. Accordingly, when a set of content items are selected for presentation to a user of the group, the online system replaces content items of the set that were previously shown to the user within the time interval with alternative content items. The online system also retrieves a previously received rating for a content item replaced by an alternative content item to use along with ratings received for content items of the set.

20 Claims, 3 Drawing Sheets

US 10,212,468 B1

OBTAINING RATINGS FOR CONTENT ITEMS FROM A GROUP OF USERS WHILE LIMITING A NUMBER OF TIMES THE CONTENT ITEMS ARE PRESENTED TO THE GROUP OF USERS WITHIN A TIME INTERVAL

BACKGROUND

This disclosure relates generally to presenting content to users of an online system, and more specifically to presenting content to a group of users of the online system subject to limitations on a number of times certain content is presented within a time interval.

Online systems, such as social networking systems, allow users to connect to and to communicate with other users of the online system. Users may create profiles on an online system that are tied to their identities and include information about the users, such as interests and demographic information. The users may be individuals or entities such as corporations or charities. Online systems allow users to easily communicate and to share content with other online system users by providing content to an online system for presentation to other users. Content provided to an online system by a user may be declarative information provided by a user, status updates, check-ins to locations, images, photographs, videos, text data, or any other information a user wishes to share with additional users of the online system. An online system may also generate content for presentation to a user, such as content describing actions taken by other users on the online system.

When selecting content items for presentation to users, many online systems account for ratings or quality scores of content items. Ratings for content items are received from users of the online system may describe a user approval or disapproval of the content included in content items, describe likelihood of users interacting with the content included in content items, describe user assessment of whether content of content items is appropriate or inappropriate, or describe any other user reaction to the content of the content items. Based on ratings received for various content items, an online system may generate or train a model that determines a quality score for content items based on characteristics of content items and ratings received from users for content items having various characteristics.

Many online systems receive ratings for presented content items from a specific group of users. However, a group of users from whom ratings for content items are received often includes a limited number of users. Having a relatively small number of users provide ratings for content items causes many online systems to present different content items to different users of the group during different time intervals to obtain ratings for content items from various users of the group. However, many online systems also maintain one or more diversity rules that limit a number of times a content item may be presented to a user during a time interval. Enforcing these diversity rules may prevent a user of the group from being presented with a content item selected for presentation to the user that was previously presented to the same user of the group within a time interval specified by a diversity rule. This enforcement of diversity rules limiting presentation of content items may influence ratings provided by users of the group for various presented content items, which may impair training of a model for subsequent selection of content items to users that limits user interaction with the subsequently selected content items.

SUMMARY

An online system receives sponsored content items from one or more publishing users. Each sponsored content item includes content for presentation to users of the online system. One or more of the content items also include a bid amount specifying an amount of compensation a publishing user provides to the online system 140 in exchange for presenting the sponsored content item.

Additionally, the online system maintains one or more rules that limit a number times one or more content items are presented to a user within a time interval. For example, a rule limits presentation of a content item to a user to a single presentation of the content item within a 24 hour interval. As another example, a rule limits presentation of the content item to a single presentation of the content item within a three day interval. In some embodiments, the online system maintains different rules for content items having different characteristics. For example, a rule limits presentation of a content item including an objective to a specific number of times (e.g. once) within a time interval, while another rule limits presentation of a content item including another objective to the specific number of times within a different time interval or to a different number of times within the time interval. Different rules with different numbers of times content items are presented or with different time intervals may be maintained for different characteristics of content items. The one or more rules may be generated by the online system in some embodiments. Alternatively, a publishing user from whom a content item is received specifies one or more rules to the online system, which maintains the one or more rules in association with the publishing user or with the content items received from the publishing user.

The online system identifies a group of users to provide ratings for various received content items. In various embodiments, the online system presents content items to particular users who provide ratings for the content items used to determine quality scores for the content items. A rating for a content item may describe a user's approval or disapproval of the content included in the content item, describe a user's likelihood of interacting with the content included in the content item, describe a user's assessment of whether the content of the content item is appropriate or inappropriate, or describe any other reaction to the content of the content item by a user. In various embodiments, the online system obtains ratings for content items from a set of specific users. The online system may select users from whom ratings are received and identify those users from a value or a setting included in user profiles maintained for the users. As another example, the online system maintains information identifying users for whom ratings for content items are received and retrieves the maintained information to identify the group of users.

To obtain ratings for one or more of the received content items from users of the group, the online system retrieves characteristics of a user of the group and selects a set of the content items for presentation to the user by applying one or more selection processes to characteristics of the content items and the retrieved characteristics of the user. Any suitable selection processes may be used by the online system to select the set of content items. For example, the online system selects the set of content items based on measures of relevance of content items to the user based on characteristics of the user and characteristics of content items. As another example, the online system selects the set of content items based on scores for various content items. A score for a content item is based on an expected value of the content item and an expected amount of interaction with content from the content item by the user, with the expected value of the content item accounting for a bid amount included in the content item and a likelihood of the user interacting with the content item. In various embodiments, the online system selects a particular number of content items (e.g., 20 content items, 25 content items) for inclusion in the set.

Based on stored information identifying content items presented to the user, the online system identifies content items of the set that were previously presented to the user within a time interval specified by one or more of the maintained rules. For example, the online system compares an identifier of a content item of the set to identifiers of content items previously presented to the user. As the online system maintains information identifying times when content items were presented to the user, the online system compares information identifying a content item of the set, such as identifier, to maintained information identifying content items previously presented to the user. If an identifier of a content item of the set matches an identifier of a content item previously presented to the user from the information maintained by the online system, the online system retrieves a time when the content item of the set was previously presented to the user from the maintained information. If the retrieved time when the content item of the set was previously presented to the user is within a time interval specified by a rule maintained by the online system for the content item, the online system determines the content item of the set was previously presented to the user within the time interval specified by the rule from a time when the content item of the set was selected. In various embodiments, the online system identifies a maintained rule associated with or corresponding to the content item of the set and determines whether a retrieved time when the content item of the set was previously presented to the user is within a time interval specified by the identified rule from the time when the content item of the set was selected.

Responsive to determining the content item of the set was previously presented to the user within the time interval specified by the rule from a time when the content item of the set was selected, the online system modifies the set of content items to remove the content item that was previously presented to the user within the time interval specified by the rule from a time when the content item of the set was selected. The online system obtains ratings for content items from the group of users, which includes a limited number of users, so the online system is unable to correlate different content items with different users of the group. Accordingly, to obtain ratings for different content items, the online system presents different content items to the users of the group at different times; for example, a user of the group is presented with different content items on different days. However, the one or more rules maintained by the online system limiting a number of times a content item is presented to a user within a time interval may affect the ratings of content items from a user of the group by biasing how the user of the group rates content items by preventing presentation of certain content items that were already presented to the user of the group but that may influence how the user of the group rates other presented content items.

Accordingly, to allow users of the group to more accurately provide ratings of content items while enforcing the one or more maintained rules limiting a number of times the content item of the set previously presented to the user of the group is presented within a time interval, the online system modifies the set by replacing the content item of the set determined to have been previously presented to the user within the time interval specified by one or more rules (i.e., specified by a rule associated with the content item of the set) with an alternative content item that has not been previously presented to the user within the time interval specified by one or more rules. In one embodiment, the online system identifies the alternative content item by applying one or more alternative selection processes to the content items to select an alternative set of content items that includes different content items than the set of the content items. For example, the online system identifies the alternative set by randomly selecting a specific number of content items that are not included in the selected set of content items. The alternative set includes fewer content items than the set of content items. For example, the selected set includes 20 content items, while the alternative set includes 5 content items. In some embodiments, the alternative set includes a number of content items that is a specific percentage of a number of content items of the set; for example, the alternative set includes a number of content items that is 5% or 10% or a number of content items in the set of content items. However, the online system may use any suitable process or processes to select the alternative content item in various embodiments. Accordingly, the online system modifies the set by removing the content item of the set determined to have been previously presented to the user within the time interval specified by one or more rules from the set and inserting an alternative content item, such as a content item of the alternative set, into the set. When removing the content item of the set determined to have been previously presented to the user within the time interval specified by one or more rules from the set, the online system stores an indication that the content item of the set determined to have been previously presented to the user within the time interval specified by one or more rules was selected for the set of content items along with a time when the content item of the set determined to have been previously presented to the user within the time interval specified by one or more rules was selected for the set.

Subsequently, the online system presents content items of the modified set of content items to the user of the group and receives a rating from the user of the group for each presented content item of the modified set. Hence, the online system receives a rating from the user for each content item of the modified set that was not previously presented to the user within the time interval specified by one or more of the maintained rules. Additionally, the online system receives a rating from the user for the alternative content item that was included in the modified set and presented to the user.

To evaluate the set of content items selected for the user, the online system retrieves a previously received rating from the user for the content item of the set determined to have been previously presented to the user within the time interval specified by one or more rules was selected for the set. The previously received rating was received by the content item when the content item from the user of the set was previously presented to the user within the time interval specified by one or more rules. Based on the previously received rating from the user for the content item of the set determined to have been previously presented to the user within the time interval specified by one or more rules was selected for the set and the received ratings for the content items of the modified set that were not previously presented to the user of the group, the online system generates data describing presentation of the set of content items.to the user. For example, the generated data identifies each content item of the set presented to the user of the group in association with the received rating from the user of the group for corresponding content items of the set. When generating the data describing presentation of the set of content items, the online system removes a received rating for the alternative content item presented to the user of the group. Hence, the generated data reflects ratings for content items of the set, even when a rating for a content item of the set was received when the content item of the set was presented to the user earlier than the other content items of the set. In various embodiments, the online system trains one or more models based on the generated data. For example, based on ratings for content items of the set and characteristics of the content item, the online system trains a model to determine quality scores for various content items based on characteristics of the content items of the set and received ratings for content items of the set.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
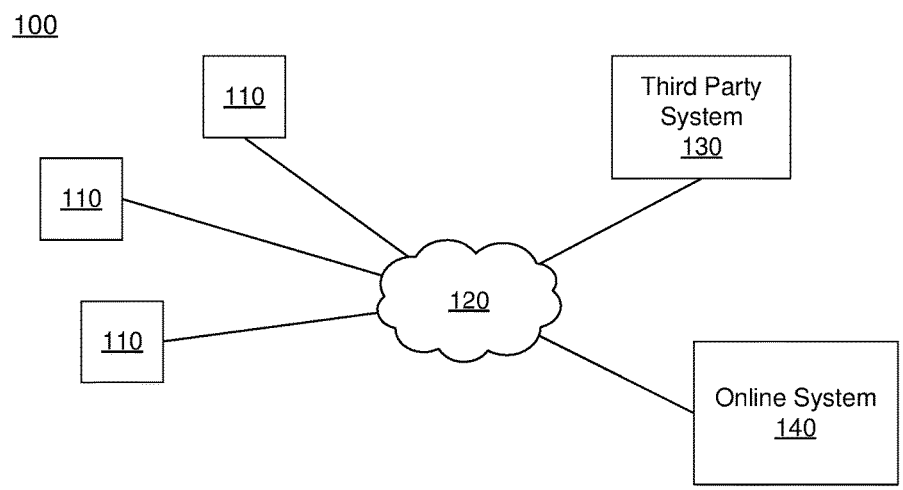
FIG. 1 is a block diagram of a system environment in which an online system operates, in accordance with an embodiment.

FIG. 1 is a block diagram of a system environment 100 for an online system 140. The system environment 100 shown by FIG. 1 comprises one or more client devices 110, a network 120, one or more third-party systems 130, and the online system 140. In alternative configurations, different and/or additional components may be included in the system environment 100. For example, the online system 140 is a social networking system, a content sharing network, or another system providing content to users.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone, a smartwatch, or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the online system 140, which is further described below in conjunction with FIG. 2. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party system 130 may also communicate information to the online system 140, such as advertisements, content, or information about an application provided by the third party system 130.

Various third party systems 130 provide content to users of the online system 140. For example, a third party system 130 maintains pages of content that users of the online system 140 may access through one or more applications executing on a client device 110. The third party system 130 may provide content items to the online system 140 identifying content provided by the online system 140 to notify users of the online system 140 of the content provided by the third party system 130. For example, a content item provided by the third party system 130 to the online system 140 identifies a page of content provided by the online system 140 that specifies a network address for obtaining the page of content. If the online system 140 presents the content item to a user who subsequently accesses the content item via a client device 110, the client device 110 obtains the page of content from the network address specified in the content item.

Figure 2:
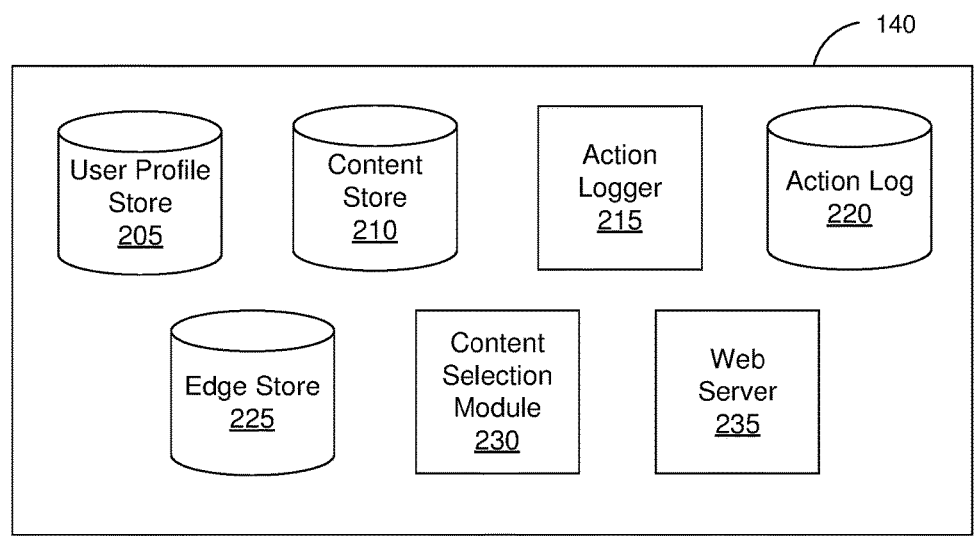
FIG. 2 is a block diagram of an online system, in accordance with an embodiment.

FIG. 2 is a block diagram of an architecture of the online system 140. The online system 140 shown in FIG. 2 includes a user profile store 205, a content store 210, an action logger 215, an action log 220, an edge store 225, a content selection module 230, and a web server 235. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 205. A user profile includes declarative information about the user that was explicitly shared by the user and may also include profile information inferred by the online system 140. In one embodiment, a user profile includes multiple data fields, each describing one or more attributes of the corresponding social networking system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the social networking system users displayed in an image, with information identifying the images in which a user is tagged stored in the user profile of the user. A user profile in the user profile store 205 may also maintain references to actions by the corresponding user performed on content items in the content store 210 and stored in the action log 220.

Each user profile includes user identifying information allowing the online system 140 to uniquely identify users corresponding to different user profiles. For example, each user profile includes an electronic mail ("email") address, allowing the online system 140 to identify different users based on their email addresses. However, a user profile may include any suitable user identifying information associated with users by the online system 140 that allows the online system 140 to identify different users.

While user profiles in the user profile store 205 are frequently associated with individuals, allowing individuals to interact with each other via the online system 140, user profiles may also be stored for entities such as businesses or organizations. This allows an entity to establish a presence on the online system 140 for connecting and exchanging content with other social networking system users. The entity may post information about itself, about its products or provide other information to users of the online system 140 using a brand page associated with the entity's user profile. Other users of the online system 140 may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a brand page, or any other type of content. Online system users may create objects stored by the content store 210, such as status updates, photos tagged by users to be associated with other objects in the online system 140, events, groups or applications. In some embodiments, objects are received from third party applications or third party applications separate from the online system 140. In one embodiment, objects in the content store 210 represent single pieces of content, or content "items." Hence, online system users are encouraged to communicate with each other by posting text and content items of various types of media to the online system 140 through various communication channels. This increases the amount of interaction of users with each other and increases the frequency with which users interact within the online system 140.

One or more content items included in the content store 210 include a creative, which is content for presentation to a user, and a bid amount. As used herein, a content item including a bid amount is referred to as a "sponsored content item," while a content item that does not include a bid amount is referred to as an "organic content item." The creative is text, image, audio, video, or any other suitable data presented to a user. In various embodiments, the creative also specifies a page of content. For example, a content item includes a landing page specifying a network address of a page of content to which a user is directed when the content item is accessed. The bid amount included in a sponsored content item specifies an amount of compensation the online system 140 receives from a publishing user associated with the sponsored content item and is used to determine an expected value, such as monetary compensation, provided by the publishing user to the online system 140 if content in the sponsored content item is presented to a user, if the content in the sponsored content item receives a user interaction when presented, or if any suitable condition is satisfied when content in the sponsored content item is presented to a user. For example, the bid amount included in a sponsored content item specifies a monetary amount that the online system 140 receives from a publishing user who provided the sponsored content item to the online system 140 if content in the sponsored content item is displayed. In some embodiments, the expected value to the online system 140 of presenting the content from the sponsored content item may be determined by multiplying the bid amount by a probability of the content of the sponsored content item being accessed by a user.

Various sponsored content items may include an objective identifying an interaction that a user associated with a sponsored content item desires other users to perform when presented with content included in the sponsored content item. Example objectives include: installing an application associated with a sponsored content item, indicating a preference for a sponsored content item, sharing a sponsored content item with other users, interacting with an object associated with a sponsored content item, or performing any other suitable interaction. As content from a sponsored content item is presented to online system users, the online system 140 logs interactions between users presented with the sponsored content item or with objects associated with the sponsored content item. Additionally, the online system 140 receives compensation from a publishing user associated with a sponsored content item as online system users perform interactions with the sponsored content item that satisfy the objective included in the sponsored content item.

Additionally, a sponsored content item may include one or more targeting criteria specified by the publishing user who provided the sponsored content item to the online system 140. Targeting criteria included in a sponsored content item request specify one or more characteristics of users eligible to be presented with the sponsored content item. For example, targeting criteria are used to identify users having user profile information, edges, or actions satisfying at least one of the targeting criteria. Hence, targeting criteria allow a publishing user to identify users having specific characteristics as eligible to be presented with content from a sponsored content item, simplifying subsequent distribution of content to different users.

In one embodiment, targeting criteria may specify actions or types of connections between a user and another user or object of the online system 140. Targeting criteria may also specify interactions between a user and objects performed external to the online system 140, such as on a third party system 130. For example, targeting criteria identifies users who have taken a particular action, such as sent a message to another user, used an application, joined a group, left a group, joined an event, generated an event description, purchased or reviewed a product or service using an online marketplace, requested information from a third party system 130, installed an application, or performed any other suitable action. Including actions in targeting criteria allows publishing users to further refine users eligible to be presented with sponsored content items. As another example, targeting criteria identifies users having a connection to another user or object or having a particular type of connection to another user or object.

The action logger 215 receives communications about user actions internal to and/or external to the online system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with the particular users as well and stored in the action log 220.

The action log 220 may be used by the online system 140 to track user actions on the online system 140, as well as actions on third party systems 130 that communicate information to the online system 140. Users may interact with various objects on the online system 140, and information describing these interactions is stored in the action log 220. Examples of interactions with objects include: commenting on posts, sharing links, checking-in to physical locations via a client device 110, accessing content items, and any other suitable interactions. Additional examples of interactions with objects on the online system 140 that are included in the action log 220 include: commenting on a photo album, communicating with a user, establishing a connection with an object, joining an event, joining a group, creating an event, authorizing an application, using an application, expressing a preference for an object ("liking" the object), expressing a reaction to an object, and engaging in a transaction. Additionally, the action log 220 may record a user's interactions with advertisements on the online system 140 as well as with other applications operating on the online system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the online system 140. For example, an e-commerce website may recognize a user of an online system 140 through a social plug-in enabling the e-commerce website to identify the user of the online system 140. Because users of the online system 140 are uniquely identifiable, e-commerce web sites, such as in the preceding example, may communicate information about a user's actions outside of the online system 140 to the online system 140 for association with the user. Hence, the action log 220 may record information about actions users perform on a third party system 130, including webpage viewing histories, advertisements or other content with which the user engaged, purchases made, and other patterns from shopping and buying. Hence, the action log 220 may include information identifying content provided by one or more third party systems 130 that a user of the online system 140 has accessed or content provided by one or more third party systems 130 with which the user of the online system 140 otherwise interacted. Various third party systems 130 may include tracking mechanisms in content comprising instructions that, when executed by a client device 110, provide information identifying the content and identifying a user of the online system 140 associated with the client device 110 to the online system 140. In various embodiments, the information provided by the tracking mechanism identifies one or more products associated with a third party system 130 and include in, or otherwise associated with, the identified content. The information identifying the content is stored in the action log 220 in association with information identifying the user to the online system 140. Additionally, actions a user performs via an application associated with a third party system 130 and executing on a client device 110 may be communicated to the action logger 215 by the application for recordation and association with the user in the action log 220.

In one embodiment, the edge store 225 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system 140, sharing a link with other users of the online system 140, and commenting on posts made by other users of the online system 140.

An edge may include various features each representing characteristics of interactions between users, interactions between users and objects, or interactions between objects. For example, features included in an edge describe a rate of interaction between two users, how recently two users have interacted with each other, a rate or an amount of information retrieved by one user about an object, or numbers and types of comments posted by a user about an object. The features may also represent information describing a particular object or user. For example, a feature may represent the level of interest that a user has in a particular topic, the rate at which the user logs into the online system 140, or information describing demographic information about the user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's interest in an object or in another user in the online system 140 based on the actions performed by the user. A user's affinity may be computed by the online system 140 over time to approximate the user's interest in an object, in a topic, or in another user in the online system 140 based on actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

The content selection module 230 selects one or more content items for communication to a client device 110 to be presented to a user. Content items eligible for presentation to the user are retrieved from the content store 210 or from another source by the content selection module 230, which selects one or more of the content items for presentation to the viewing user. A content item eligible for presentation to the user is a content item associated with at least a threshold number of targeting criteria satisfied by characteristics of the user or is a content item that is not associated with targeting criteria. In various embodiments, the content selection module 230 includes content items eligible for presentation to the user in one or more selection processes, which identify a set of content items for presentation to the user. For example, the content selection module 230 determines measures of relevance of various content items to the user based on characteristics associated with the user by the online system 140 and based on the user's affinity for different content items. Based on the measures of relevance, the content selection module 230 selects content items for presentation to the user. As an additional example, the content selection module 230 selects content items having the highest measures of relevance or having at least a threshold measure of relevance for presentation to the user. Alternatively, the content selection module 230 ranks content items based on their associated measures of relevance and selects content items having the highest positions in the ranking or having at least a threshold position in the ranking for presentation to the user.

Content items eligible for presentation to the user may include content items associated with bid amounts (i.e., "sponsored content items"). The content selection module 230 uses the bid amounts associated with ad requests when selecting content for presentation to the user. In various embodiments, the content selection module 230 determines an expected value associated with various content items based on their bid amounts and selects content items associated with a maximum expected value or associated with at least a threshold expected value for presentation. An expected value associated with a content item represents an expected amount of compensation to the online system 140 for presenting the content item. For example, the expected value associated with a content item is a product of the ad request's bid amount and a likelihood of the user interacting with the content item. The content selection module 230 may rank content items based on their associated bid amounts and select content items having at least a threshold position in the ranking for presentation to the user. In some embodiments, the content selection module 230 ranks both content items not associated with bid amounts and content items associated with bid amounts in a unified ranking based on bid amounts and measures of relevance associated with content items. For example, the content selection module 230 generates a score for sponsored content items by combining bid amounts included in sponsored content items (or expected values of sponsored content items) with expected amounts of interaction with content included in the sponsored content items. The content selection module 230 selects sponsored content items and organic content items for presentation to the user based on their scores and measures of relevance (or expected amounts of interaction), respectively. Based on the unified ranking, the content selection module 230 selects content for presentation to the user. Selecting content items associated with bid amounts and content items not associated with bid amounts through a unified ranking is further described in U.S. patent application Ser. No. 13/545,266, filed on Jul. 10, 2012, which is hereby incorporated by reference in its entirety.

For example, the content selection module 230 receives a request to present a feed of content to a user of the online system 140. The feed may include one or more content items including bid amounts (i.e., "sponsored content items") and other content items that do not include bid amounts ("organic content items"), such as stories describing actions associated with other online system users connected to the user. The content selection module 230 accesses one or more of the user profile store 205, the content store 210, the action log 220, and the edge store 225 to retrieve information about the user. For example, information describing actions associated with other users connected to the user or other data associated with users connected to the user are retrieved. Content items from the content store 210 are retrieved and analyzed by the content selection module 230 to identify candidate content items eligible for presentation to the user. For example, content items associated with users who not connected to the user or stories associated with users for whom the user has less than a threshold affinity are discarded as candidate content items. Based on various criteria, the content selection module 230 selects one or more of the content items identified as candidate content items for presentation to the identified user. The selected content items are included in a feed of content that is presented to the user. For example, the feed of content includes at least a threshold number of content items describing actions associated with users connected to the user via the online system 140.

In various embodiments, the content selection module 230 presents content to a user through a feed of content including a plurality of content items selected for presentation to the user. One or more content items may also be included in the feed of content. The content selection module 230 may also determine the order in which selected content items are presented via the feed of content. For example, the content selection module 230 orders content items content in the feed based on likelihoods of the user interacting with various content items.

In various embodiments, the content selection module 230 applies one or more models to content items that generate quality scores for various content items and uses the quality scores when selecting content items for inclusion in a feed of content presented to a user. The content selection model 230 obtains data for generating or for training the one or more models based on ratings for content items received from a group of users. However, the group includes a limited number of users, causing the content selection module 230 to present different content items to users of the group during different time intervals to obtain ratings for different content items from multiple users of the group. However, the content selection module 230 also enforces rules that limits a number of times a content item may be presented to a user within a time interval. Accordingly, when the content selection module 230 selects a set of content items for presentation to a user of the group, the content selection module 230 replaces content items of the set that were previously shown to the user within the time interval with alternative content items, as further described below in conjunction with FIGS. 2 and 3. When generating data describing presentation of the set of content items to the user of the group, the content selection module 230 retrieves a previously received rating for a content item replaced by an alternative content item and generates the data using the ratings received for content items of the set and the previously received rating for a content item replaced by an alternative content item, as further described below in conjunction with FIG. 3.

The web server 235 links the online system 140 via the network 120 to the one or more client devices 110, as well as to the one or more third party systems 130. The web server 235 serves web pages, as well as other content, such as JAVA®, FLASH®, XML and so forth. The web server 235 may receive and route messages between the online system 140 and the client device 110, for example, instant messages, queued messages (e.g., email), text messages, short message service (SMS) messages, or messages sent using any other suitable messaging technique. A user may send a request to the web server 235 to upload information (e.g., images or videos) that are stored in the content store 210. Additionally, the web server 235 may provide application programming interface (API) functionality to send data directly to native client device operating systems, such as IOS®, ANDROID™, or BlackberryOS.

Figure 3:
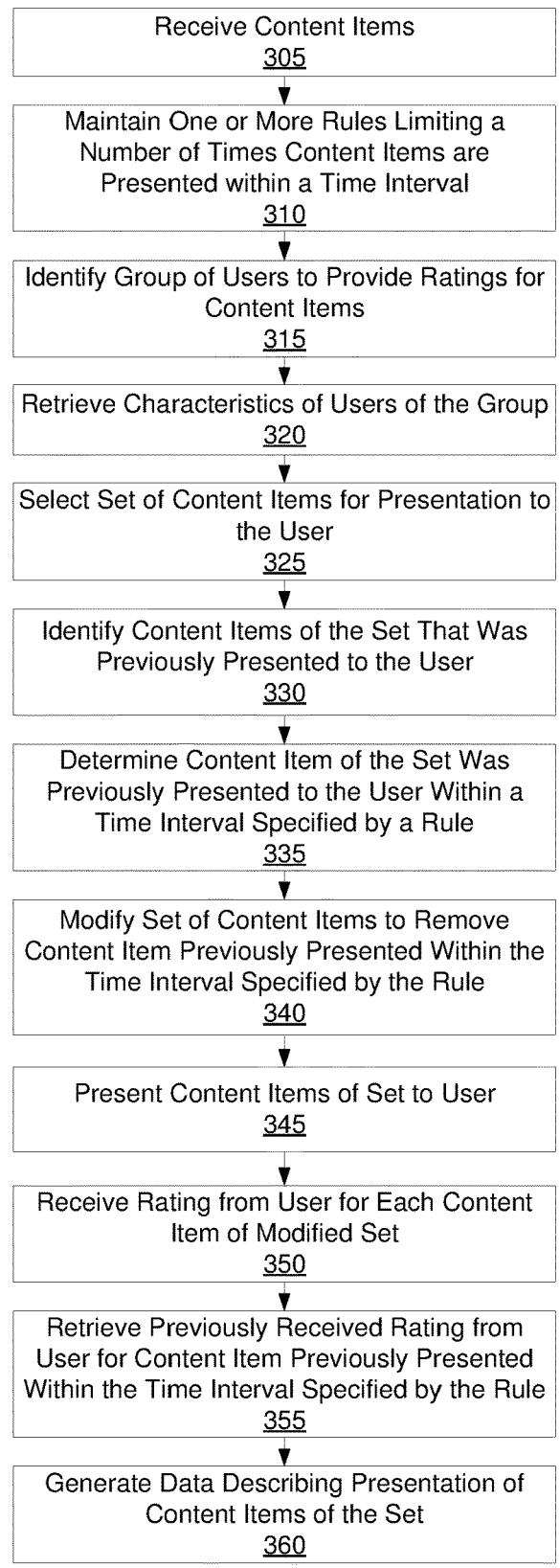
FIG. 3 is flowchart of a method for generating information rating content items presented to users while limiting a number of times the content items are presented to the users within a time interval, in accordance with an embodiment.

Generating Data Describing Rating of Content Items while Limiting a Number of Times Content Items are Presented in a Time Interval FIG. 3 is a flowchart of one embodiment of a method for generating information rating content items presented to users while limiting a number of times the content items are presented to the users within a time interval. In other embodiments, the method may include different and/or additional steps than those shown in FIG. 3. Additionally, steps of the method may be performed in different orders than the order described in conjunction with FIG. 3 in various embodiments.

The online system 140 receives 305 content items from one or more publishing users. Each content item includes content for presentation to users of the online system 140. In some embodiments, as further described above in conjunction with FIG. 2, one or more of the content items also include a bid amount specifying an amount of compensation a publishing user provides to the online system 140 in exchange for presenting the sponsored content item. For example, the bid amount included in a content item identifies an amount of compensation provided by a publishing to the online system 140 if content in the sponsored content item is presented to a user, if a user to whom content in the content item is presented performs one or more actions after being presented with the content, or if any suitable condition is satisfied when content in the content item is presented to a user. For example, the bid amount included in a content item specifies a monetary amount that the online system 140 receives from a publishing user who provided the content item to the online system 140 if content in the content item is displayed.

One or more content items may include an objective specifying a specific action that a publishing user desires other users to perform when presented with content included in the content item. Example objectives include: installing an application associated with the content item, indicating a preference for the content item, sharing a content item with other users, interacting with an object associated with a content item, purchasing an item via an application associated with the content item, or performing any other suitable action. Additionally, a content item may also include targeting criteria specifying characteristics of users of the online system 140 who are eligible to be presented with content from the content item in various embodiments. If a content item includes targeting criteria, the content item is eligible for presentation to users having characteristics satisfying at least a threshold amount of the targeting criteria and is not eligible for presentation to users having characteristics that do not satisfy at least the threshold amount of the targeting criteria. The online system 140 stores the content items received from the one or more publishing users.

Additionally, the online system 140 maintains 310 one or more rules that limit a number times one or more content items are presented to a user within a time interval. For example, a rule limits presentation of a content item to a user to a single presentation of the content item within a 24 hour interval. As another example, a rule limits presentation of the content item to a single presentation of the content item within a three day interval. In some embodiments, the online system 140 maintains 310 different rules for content items having different characteristics. For example, a rule limits presentation of a content item including an objective to a specific number of times (e.g. once) within a time interval, while another rule limits presentation of a content item including another objective to the specific number of times within a different time interval or to a different number of times within the time interval. Different rules with different numbers of times content items are presented or with different time intervals may be maintained for different characteristics of content items. The one or more rules may be generated by the online system 140 in some embodiments. Alternatively, a publishing user from whom a content item is received 305 specifies one or more rules to the online system 140, which maintains 310 the one or more rules in association with the publishing user or with the content items received 305 from the publishing user.

The online system 140 identifies 315 a group of users to provide ratings for various received content items. In various embodiments, the online system 140 presents content items to particular users who provide ratings for the content items used to determine quality scores for the content items. A rating for a content item may describe a user's approval or disapproval of the content included in the content item, describe a user's likelihood of interacting with the content included in the content item, describe a user's assessment of whether the content of the content item is appropriate or inappropriate, or describe any other reaction to the content of the content item by a user. In various embodiments, the online system 140 obtains ratings for content items from a set of specific users. The online system 140 may select users from whom ratings are received and identify those users from a value or a setting included in user profiles maintained for the users. As another example, the online system 140 maintains information identifying users for whom ratings for content items are received and retrieves the maintained information to identify 315 the group of users.

To obtain ratings for one or more of the received content items from users of the group, the online system 140 retrieves 320 characteristics of a user of the group and selects 325 a set of the content items for presentation to the user by applying one or more selection processes to characteristics of the content items and the retrieved characteristics of the user. One or more selection processes used to select 325 the set of content items are further described above in conjunction with FIG. 2. For example, the online system 140 determines measures of relevance to the user for multiple content items. A measure of relevance to the user for a content item is determined by applying one or more models to characteristics of the content item and to characteristics of the user. In various embodiments, a content item's measure of relevance to the user is based on a likelihood of the user performing one or more interactions with the content item; the likelihood of the user performing an interaction with the content item is determined based on prior interactions by the user with previously presented content items, characteristics of the content item, characteristics of previously presented content items with which the user interacted, and characteristics of the user in various embodiments. In various embodiments, the online system 140 selects 325 the set of content items as c content items having at least a threshold measure of relevance to the user. Alternatively, the online system 140 ranks content items based on their measures of relevance to the user and selects 325 the set of content items as content items having at least a threshold position in the ranking.

If one or more received content items include bid amounts, the online system 140 determines a score for each content item, with a score of a content item based on an expected value of the content item and an expected amount of interaction with content from the content item by the user. As further described above, the online system 140 applies one or more models to characteristics of the user and characteristics of content in the content item to determine the expected amount of interaction with content from the content item. The expected amount of interaction with content from the content item may be based on specific types of prior actions (e.g., commenting, expressing a preference for a content item, sharing a content item, etc.) by the user associated with previously presented content items, in some embodiments. For example, the expected amount of interaction is determined based on the user's prior indications of preference for previously presented content items within a specified time interval or based on the user's selection of previously presented content items within a specified time interval. This determination may be based on information retrieved from the user profile store 205, the action log 220, or the edge store 225 describing interactions between the user and presented content items. This allows the score of a content item to account for the expected compensation to the online system 140 from presenting the content item as well as a benefit to the online system 140 from interaction with the content item. In various embodiments, the online system 140 uses a conversion factor to convert the bid amount included in a content item, or the expected value of a content item, and the expected amount of interaction by the user with the content item into a common unit of measurement, allowing a single score associated with the content item to account for the expected amount of user interaction with the content item and the bid amount included in the content item (or the expected value of the content item). Combining a bid amount (or an expected value) with an expected amount of user interaction is further described in U.S. patent application Ser. No. 13/545,266, filed on Jul. 10, 2012, which is hereby incorporated by reference in its entirety. The online system 140 selects 325 content items having at least a threshold score in some embodiments. Alternatively, the online system 140 ranks content items based on their scores and selects 325 content items having at least a threshold position in the ranking. In various embodiments, the online system 140 selects 325 a particular number of content items (e.g., 20 content items, 25 content items).

Based on stored information identifying content items presented to the user, the online system 140 identifies 330 content items of the set that were previously presented to the user within a time interval specified by one or more of the maintained rules. For example, the online system 140 compares an identifier of a content item of the set to identifiers of content items previously presented to the user from the action log 220. As the online system 140 maintains information identifying times when content items were presented to the user, the online system 140 compares information identifying a content item of the set, such as identifier, to maintained information identifying content items previously presented to the user. If an identifier of a content item of the set matches an identifier of a content item previously presented to the user from the information maintained by the online system 140, the online system 140 retrieves a time when the content item of the set was previously presented to the user from the maintained information. If the retrieved time when the content item of the set was previously presented to the user is within a time interval specified by a rule maintained 310 by the online system 140 for the content item, the online system 140 determines 335 the content item of the set was previously presented to the user within the time interval specified by the rule from a time when the content item of the set was selected 325. In various embodiments, the online system 140 identifies a maintained rule associated with or corresponding to the content item of the set and determines 335 whether a retrieved time when the content item of the set was previously presented to the user is within a time interval specified by the identified rule from the time when the content item of the set was selected 325.

In response to determining 335 the content item of the set was previously presented to the user within the time interval specified by the rule from a time when the content item of the set was selected 325, the online system 140 modifies 340 the set of content items to remove the content item that was previously presented to the user within the time interval specified by the rule from a time when the content item of the set was selected 325. The online system 140 obtains ratings for content items from the group of users, which includes a limited number of users, so the online system 140 is unable to correlate different content items with different users of the group. Accordingly, to obtain ratings for different content items, the online system 140 presents different content items to the users of the group at different times; for example, a user of the group is presented with different content items on different days. However, the one or more rules maintained 310 by the online system 140 limiting a number of times a content item is presented to a user within a time interval may affect the ratings of content items from a user of the group by biasing how the user of the group rates content items by preventing presentation of certain content items that were already presented to the user of the group but that may influence how the user of the group rates other presented content items.

Accordingly, to allow users of the group to more accurately provide ratings of content items while enforcing the one or more maintained 310 rules limiting a number of times the content item of the set previously presented to the user of the group is presented within a time interval, the online system 140 modifies 340 the set by replacing the content item of the set determined 335 to have been previously presented to the user within the time interval specified by one or more rules (i.e., specified by a rule associated with the content item of the set) with an alternative content item that has not been previously presented to the user within the time interval specified by one or more rules. In one embodiment, the online system 140 identifies the alternative content item by applying one or more alternative selection processes to the content items to select an alternative set of content items that includes different content items than the set of the content items. For example, the online system 140 identifies the alternative set by randomly selecting a specific number of content items that are not included in the selected set of content items. The alternative set includes fewer content items than the set of content items. For example, the selected set includes 20 content items, while the alternative set includes 5 content items. In some embodiments, the alternative set includes a number of content items that is a specific percentage of a number of content items of the set; for example, the alternative set includes a number of content items that is 5% or 10% or a number of content items in the set of content items. However, the online system 140 may use any suitable process or processes to select the alternative content item in various embodiments. Accordingly, the online system 140 modifies 340 the set by removing the content item of the set determined 335 to have been previously presented to the user within the time interval specified by one or more rules from the set and inserting an alternative content item, such as a content item of the alternative set, into the set. When removing the content item of the set determined 335 to have been previously presented to the user within the time interval specified by one or more rules from the set, the online system 140 stores an indication that the content item of the set determined 335 to have been previously presented to the user within the time interval specified by one or more rules was selected 325 for the set of content items along with a time when the content item of the set determined 335 to have been previously presented to the user within the time interval specified by one or more rules was selected 325 for the set.

Subsequently, the online system 140 presents 345 content items of the modified set of content items to the user of the group and receives 350 a rating from the user of the group for each presented content item of the modified set. Hence, the online system 140 receives 350 a rating from the user for each content item of the modified set that was not previously presented to the user within the time interval specified by one or more of the maintained rules. Additionally, the online system 140 receives 350 a rating from the user for the alternative content item that was included in the modified set and presented 345 to the user.

To evaluate the set of content items selected 325 for the user, the online system 140 retrieves 355 a previously received rating from the user for the content item of the set determined 335 to have been previously presented to the user within the time interval specified by one or more rules was selected 325 for the set. The previously received rating was received by the content item when the content item from the user of the set was previously presented to the user within the time interval specified by one or more rules. Based on the previously received rating from the user for the content item of the set determined 335 to have been previously presented to the user within the time interval specified by one or more rules was selected 325 for the set and the received 350 ratings for the content items of the modified set that were not previously presented to the user of the group, the online system 140 generates 360 data describing presentation of the set of content items to the user. For example, the generated data identifies each content item of the set presented to the user of the group in association with the received rating from the user of the group for corresponding content items of the set. When generating 360 the data describing presentation of the set of content items, the online system 140 removes a received rating for the alternative content item presented to the user of the group. Hence, the generated data reflects ratings for content items of the set, even when a rating for a content item of the set was received when the content item of the set was presented 345 to the user earlier than the other content items of the set. In various embodiments, the online system 140 trains one or more models based on the generated data. For example, based on ratings for content items of the set and characteristics of the content item, the online system 140 trains a model to determine quality scores for various content items based on characteristics of the content items of the set and received ratings for content items of the set. In various embodiments, the online system 140 subsequently applies the trained model to other content items to determine quality scores for the other content items; subsequently, the online system 140 may use the quality scores for various content items to select content items for presentation to users.

Figure 4:
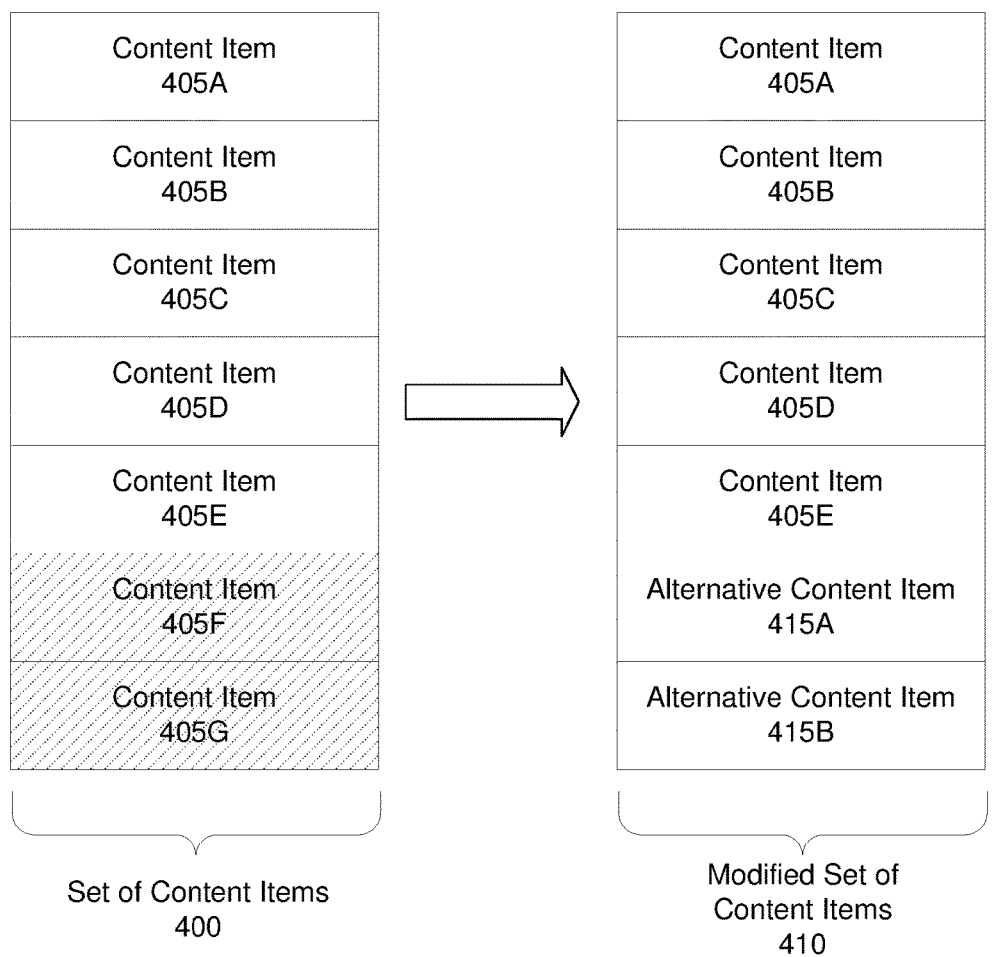
FIG. 4 is a process flow diagram of generating information rating content items presented to users while limiting a number of times the content items are presented to the users within a time interval, in accordance with an embodiment.

FIG. 4 is a process flow diagram of generating information rating content items presented to users while limiting a number of times the content items are presented to the users within a time interval. In the example of FIG. 4, a set 400 of content items have been selected for presentation to a user of a group, as further described above in conjunction with FIGS. 2 and 3. The set 400 includes content items 405A-G in the example of FIG. 4. As further described above in conjunction with FIG. 3, in addition to selecting the set 400 of content items, the online system 140 identifies content items previously presented to the user by the online system 140 and determines whether one or more content items 405A-G of the set have been previously presented to the user a number of times within a time interval from selection of the set 400 that is specified by one or more rules maintained by the online system 140

In the example of FIG. 4, the online system 140 determines that content item 405F and content item 405G have each been previously presented to the user the number of times within the time interval from selection of the set 400 that is specified by one or more rules maintained by the online system 140. To prevent presentation of content item 405F and content item 405G to the user more than the number of times within the time interval from selection of the set 400 specified by one or more maintained rules, the online system 140 generates a modified set 410 of content items by replacing content item 405F and content item 405G with alternative content item 415A and alternative content item 415B, respectively. For example, the online system 140 randomly selects alternative content item 415A and alternative content item 415B from content items maintained by the online system 140. Subsequently, the online system 140 presents the modified set 410 of content items, which includes content items 405A-E, alternative content item 415A, and alternative content item 415B (but does not include content item 405F and content item 405G) to the user. As further described above in conjunction with FIG. 3, the online system 140 subsequently receives ratings for content items of the modified set 410 and generates data describing presentation of the set of content items to the user. Presenting alternative content item 415A and alternative content item 415B to the user in place of content item 405F and content item 405G, which were previously presented to the user the number of times within the time interval from selection of the set 400 that is specified by one or more maintained rules, prevents ratings received from the user for content items 405A-E from being influenced or affected from the user's prior reaction or expectations from prior presentation of content item 405F and content item 405G.

CONCLUSION

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
receiving, at an online system, content items for presentation to users of the online system;
maintaining one or more rules at the online system, the one or more rules limiting a number of times one or more content items are presented within a time interval;
identifying a group of users of the online system;
retrieving characteristics of a user of the group maintained by the online system;
selecting a set of the content items for presentation to the user by applying one or more selection processes to characteristics of the content items and the retrieved characteristics of the user;
identifying content items of the set previously presented to the user within the time interval specified by one or more of the maintained rules;
determining a content item of the set was previously presented to the user within the time interval specified by one or more of the maintained rules by comparing content items of the set to the identified content items previously presented to the user within the time interval specified by one or more of the maintained rules;
modifying the set of content items by replacing the content item of the set determined to have been previously presented to the user within the time interval specified by one or more of the maintained rules with an alternative content item that has not been previously presented to the user within the time interval specified by one or more of the maintained rules;
presenting content items of the modified set of content items to the user;
receiving, at the online system, a rating from the user for each of the content items of the modified set of content items from the user that were not previously presented to the user within the time interval specified by one or more of the maintained rules;
retrieving a previously received rating for the content item of the set determined to have been previously presented to the user within the time interval specified by one or more of the maintained rules, the previously perceived rating received by the online system when the content item was previously presented to the user;
generating data describing presentation of the content items of the set including the ratings received for content items of the modified set that were not previously presented to the user within the time interval specified by one or more of the maintained rules and including the previously received rating for the content item of the set determined to have been previously presented to the user within the time interval specified by one or more of the maintained rules; and
training a model to determine a quality score for one or more content items based on the generated data describing presentation of the content items of the modified set and characteristics of content items of the set.

2. The method of claim 1, wherein selecting the set of the content items for presentation to the user by applying one or more selection processes to characteristics of the content items and the retrieved characteristics of the user comprises:
selecting the set of the content items for presentation to the user by applying one or more selection processes to characteristics of the content items and the retrieved characteristics of the user; and
selecting an alternative set of the content items for presentation to the user by applying one or more alternative selection processes to the content items, the alternative set of the content items including different content items than the set of the content items.

3. The method of claim 2, wherein modifying the set of content items by replacing the content item of the set determined to have been previously presented to the user within the time interval specified by one or more of the maintained rules with the alternative content item that has not been previously presented to the user within the time interval specified by one or more of the maintained rules comprises:
    replacing the content item of the set determined to have been previously presented to the user within the time interval specified by one or more of the maintained rules with a content item of the alternative set of content items.

4. The method of claim 2, wherein the alternative set includes fewer content items than the set.

5. The method of claim 2, wherein the alternative set includes a number of content items that is a specific percentage of a number of content items of the set.

6. The method of claim 2, wherein selecting the alternative set of the content items for presentation to the user comprises:
    randomly selecting one or more content items from the received content items that are not included in the set.

7. The method of claim 1, wherein a rating received for the alternative content item presented to the user is removed from the data describing the content items of the modified set.

8. The method of claim 1, wherein modifying the set of content items by replacing the content item of the set determined to have been previously presented to the user within the time interval specified by one or more of the maintained rules with the alternative content item that has not been previously presented to the user within the time interval specified by one or more of the maintained rules comprises:
    randomly selecting the alternative content item from the received content items that are not included in the set;
    removing the content item of the set determined to have been previously presented to the user within the time interval specified by one or more of the maintained rules; and
    inserting the alternative content item in the set.

9. The method of claim 1, further comprising:
    storing the trained model to memory;
    in response to determining that a given user of the online system is accessing the online system, retrieving the trained model from the memory;
    determining a plurality of other content items not from the set that are available for presentation to the user;
    determining a respective quality score for each one of the plurality of other content items by applying the trained model to each of the other content items of the plurality of other content items; and
    selecting, based on each respective quality score, a given one of the other content items for presentation to the given user.

10. The method of claim 1, wherein modifying the set of content items by replacing the content item of the set determined to have been previously presented to the user within the time interval specified by one or more of the maintained rules with the alternative content item that has not been previously presented to the user within the time interval specified by one or more of the maintained rules comprises:
    storing an indication the content item of the set determined to have been previously presented to the user within the time interval specified by one or more of the maintained rules was selected for the set; and
    modifying the set by replacing the content item of the set determined to have been previously presented to the user within the time interval specified by one or more of the maintained rules with the alternative content item.

11. A computer program product comprising a non-transitory computer readable storage medium having instructions encoded thereon that, when executed by a processor, cause the processor to:
    receive, at an online system, content items for presentation to users of the online system;
    maintain one or more rules at the online system, the one or more rules limiting a number of times one or more content items are presented within a time interval;
    identify a group of users of the online system;
    retrieve characteristics of a user of the group maintained by the online system;
    select a set of the content items for presentation to the user by applying one or more selection processes to characteristics of the content items and the retrieved characteristics of the user;
    identify content items of the set previously presented to the user within the time interval specified by one or more of the maintained rules;
    determine a content item of the set was previously presented to the user within the time interval specified by one or more of the maintained rules by comparing content items of the set to the identified content items previously presented to the user within the time interval specified by one or more of the maintained rules;
    modify the set of content items by replacing the content item of the set determined to have been previously presented to the user within the time interval specified by one or more of the maintained rules with an alternative content item that has not been previously presented to the user within the time interval specified by one or more of the maintained rules;
    present content items of the modified set of content items to the user;
    receive, at the online system, a rating from the user for each of the content items of the modified set of content items from the user that were not previously presented to the user within the time interval specified by one or more of the maintained rules;
    retrieve a previously received rating for the content item of the set determined to have been previously presented to the user within the time interval specified by one or more of the maintained rules, the previously perceived rating received by the online system when the content item was previously presented to the user; and
    generate data describing presentation of the content items of the set including the ratings received for content items of the modified set that were not previously presented to the user within the time interval specified by one or more of the maintained rules and including the previously received rating for the content item of the set determined to have been previously presented to the user within the time interval specified by one or more of the maintained rules.

12. The computer program product of claim 11, wherein select the set of the content items for presentation to the user by applying one or more selection processes to characteristics of the content items and the retrieved characteristics of the user comprises:
    select the set of the content items for presentation to the user by applying one or more selection processes to characteristics of the content items and the retrieved characteristics of the user; and select an alternative set of the content items for presentation to the user by applying one or more alternative selection processes to the content items, the alternative set of the content items including different content items than the set of the content items.

13. The computer program product of claim 12, wherein modify the set of content items by replacing the content item of the set determined to have been previously presented to the user within the time interval specified by one or more of the maintained rules with the alternative content item that has not been previously presented to the user within the time interval specified by one or more of the maintained rules comprises:
    replace the content item of the set determined to have been previously presented to the user within the time interval specified by one or more of the maintained rules with a content item of the alternative set of content items.

14. The computer program product of claim 12, wherein the alternative set includes fewer content items than the set.

15. The computer program product of claim 12, wherein the alternative set includes a number of content items that is a specific percentage of a number of content items of the set.

16. The computer program product of claim 12, wherein select the alternative set of the content items for presentation to the user comprises:
    randomly selecting one or more content items from the received content items that are not included in the set.

17. The computer program product of claim 11, wherein a rating received for the alternative content item presented to the user is removed from the data describing the content items of the modified set.

18. The computer program product of claim 11, wherein modify the set of content items by replacing the content item of the set determined to have been previously presented to the user within the time interval specified by one or more of the maintained rules with the alternative content item that has not been previously presented to the user within the time interval specified by one or more of the maintained rules comprises:
    randomly selecting the alternative content item from the received content items that are not included in the set;
    remove the content item of the set determined to have been previously presented to the user within the time interval specified by one or more of the maintained rules; and
    inserting the alternative content item in the set.

19. The computer program product of claim 11, wherein the non-transitory computer readable storage medium further has instructions encoded thereon that, when executed by the processor, cause the processor to:
    store the trained model to memory;
    in response to determining that a given user of the online system is accessing the online system, retrieving the trained model from the memory;
    determining a plurality of other content items not from the set that are available for presentation to the user;
    determine a respective quality score for each one of the plurality of other content items by applying the trained model to each of the other content items of the plurality of other content items; and
    selecting, based on each respective quality score, a given one of the other content items for presentation to the given user.

20. The computer program product of claim 11, wherein modify the set of content items by replacing the content item of the set determined to have been previously presented to the user within the time interval specified by one or more of the maintained rules with the alternative content item that has not been previously presented to the user within the time interval specified by one or more of the maintained rules comprises:
    store an indication the content item of the set determined to have been previously presented to the user within the time interval specified by one or more of the maintained rules was selected for the set; and
    modify the set by replacing the content item of the set determined to have been previously presented to the user within the time interval specified by one or more of the maintained rules with the alternative content item.

* * * * *